(12) United States Patent
Dixon et al.

(10) Patent No.: US 8,914,483 B1
(45) Date of Patent: Dec. 16, 2014

(54) SYSTEM AND METHOD FOR EVENT MANAGEMENT AND INFORMATION SHARING

(75) Inventors: Jonathan Dixon, Morden (GB); Arunesh Mishra, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 13/050,195

(22) Filed: Mar. 17, 2011

(51) Int. Cl.
*G06F 15/173* (2006.01)

(52) U.S. Cl.
USPC ............ 709/223; 709/221; 709/222; 709/227

(58) Field of Classification Search
USPC ................................................ 709/223, 206
See application file for complete search history.

(56) References Cited

U.S. PATENT DOCUMENTS

| | | | | |
|---|---|---|---|---|
| 7,489,946 | B2 * | 2/2009 | Srinivasan et al. | 455/556.1 |
| 7,804,426 | B2 * | 9/2010 | Etcheson | 340/937 |
| 8,359,540 | B2 * | 1/2013 | Darling | 715/751 |
| 8,380,039 | B2 | 2/2013 | Luo et al. | |
| 8,412,773 | B1 * | 4/2013 | Chapweske et al. | 709/205 |
| 8,761,523 | B2 * | 6/2014 | Cok et al. | 382/224 |
| 2004/0073615 | A1 * | 4/2004 | Darling | 709/206 |
| 2005/0010470 | A1 * | 1/2005 | Marino | 705/10 |
| 2006/0125930 | A1 | 6/2006 | Mindrum et al. | |
| 2006/0159007 | A1 * | 7/2006 | Frutiger et al. | 370/216 |
| 2006/0234769 | A1 * | 10/2006 | Srinivasan et al. | 455/556.1 |
| 2007/0260361 | A1 * | 11/2007 | Etcheson | 701/1 |
| 2008/0114844 | A1 | 5/2008 | Sanchez et al. | |
| 2009/0191902 | A1 * | 7/2009 | Osborne | 455/466 |
| 2009/0319472 | A1 | 12/2009 | Jain et al. | |
| 2010/0124378 | A1 | 5/2010 | Das et al. | |
| 2010/0169389 | A1 | 7/2010 | Weber et al. | |
| 2010/0318611 | A1 * | 12/2010 | Curtin et al. | 709/206 |
| 2011/0080424 | A1 | 4/2011 | Peters et al. | |
| 2011/0099199 | A1 | 4/2011 | Stalenhoef et al. | |
| 2011/0138003 | A1 * | 6/2011 | Yoon et al. | 709/206 |
| 2011/0161423 | A1 * | 6/2011 | Pratt et al. | 709/205 |
| 2011/0211737 | A1 | 9/2011 | Krupka et al. | |
| 2012/0082378 | A1 | 4/2012 | Peters et al. | |
| 2012/0136689 | A1 * | 5/2012 | Ickman et al. | 705/7.19 |
| 2012/0153016 | A1 * | 6/2012 | Slaby et al. | 235/375 |
| 2012/0213404 | A1 | 8/2012 | Steiner | |
| 2012/0251011 | A1 | 10/2012 | Gao et al. | |
| 2012/0278387 | A1 | 11/2012 | Garcia et al. | |
| 2013/0006882 | A1 * | 1/2013 | Galliani | 705/319 |
| 2013/0129232 | A1 * | 5/2013 | Cok et al. | 382/224 |

FOREIGN PATENT DOCUMENTS

| | | |
|---|---|---|
| WO | WO-2007/113462 | 10/2007 |
| WO | WO-2009/082814 | 7/2009 |

* cited by examiner

*Primary Examiner* — Jude Jean Gilles
(74) *Attorney, Agent, or Firm* — McDermott Will & Emery LLP

(57) ABSTRACT

Systems and methods are provided for real-time information sharing. A server receives, from a first user device, a request to create an event and to share information among a group of user devices only within a predetermined time period. The server receives information from the respective user devices in the group during the predetermined time period, and distributes the received information to the group of user devices during the predetermined time period. The information comprises at least one of geographic locations of the group of user devices and still pictures or video taken by one or more of the group of user devices during the event.

19 Claims, 13 Drawing Sheets

SYSTEM AND METHOD FOR EVENT MANAGEMENT AND INFORMATION SHARING

BACKGROUND OF THE INVENTION

1. Field of the Invention

The present invention relates generally to group event management and information sharing during the event among the participants. The information shared includes participants' locations, routes and navigations.

2. Description of Related Art

Existing social networking applications offer the ability to allow certain mobile device users to see their locations through a map application. After going through a mutual friend-establishment protocol, users may control the visibility, accuracy and details of what each of the other users can see.

Often, a group of people plan to meet temporarily for a common activity or event, such as a conference or an excursion. These people may or may not know each other socially. For these temporary meet-up scenarios, the participants may desire to share information including their respective locations during the limited period of the event. The friend-establishment protocols found in the current social networking applications may be cumbersome to establish an intended-temporary and loosely-bound relationship for these meet-up scenarios. The participants may also find it awkward having to explicitly rescind the relationship when the event comes to an end.

SUMMARY OF THE INVENTION

Aspects of invention provide systems and methods for real-time information sharing among a predetermined group of user devices within a predetermined period of time for a common activity.

In one embodiment of the invention, a method executable by a processor for providing information sharing is provided. The method comprises receiving, from a first user device, a request to create an event and to share information among a group of user devices only within a predetermined time period associated with the event. The method also comprises receiving information from each respective user device in the group during the predetermined time period; and distributing the received information only to the group of user devices during the predetermined time period, wherein the information comprises at least one of geographic locations of the group of user devices and imagery taken by one or more of the group of user devices during the event.

In one example, the method also comprises receiving contact addresses associated with users of the group of user devices; sending an invitation to respective ones of the received contact addresses upon the creation of the event; and receiving responses to the invitations from respective ones of the group of user devices, the responses comprising accepting the invitation or declining the invitation.

In another example, the method comprises receiving and publishing the received information for presentation through a user interface, wherein the user interface comprises at least one of a calendar application, a map application, and a social networking application.

In a further example, the method comprises receiving a privacy setting from a respective user device of the group of devices; and disallowing the information related to the respective user device to be transmitted to the other user devices in the group based on the received privacy setting.

In one alternative, the method comprises automatically registering and distributing an initial location of the group of user devices when the predetermined time period begins.

In another alternative, distributing the received information to the group of user devices further comprises distributing a request for consensus along with a piece of the received information; receiving responses from one or more of the group's user devices responding to the request; generating, based on the received responses, updated information related to the event; and distributing the generated information to the group of user devices.

In a further alternative, the method comprises automatically ending sharing the information when the predetermined time period expires.

In one example, the method comprises sending a notification to each user device in the group when information sharing extends beyond the predetermined time period.

In another example, the method comprises processing the information received during the predetermined time period; generating a summary of the event after the predetermined time period expires; and distributing the generated event summary to the user devices in the group.

In a further example, the method comprises receiving permission settings from one or more of the user devices in the group; and distributing, after the predetermined time period expires, contact information related to the one or more user devices to other user devices in the group based on the received permission settings.

In another embodiment of the invention, a server apparatus for providing real time information sharing is provided. The server apparatus comprises a processor and a memory coupled to the processor. The memory stores instructions executable by the processor. The instructions comprises instructions for receiving, from a first user device, a request to create an event and to share information among a group of user devices only within a predetermined time period; receiving information from each respective user device in the group during the predetermined time period; and distributing the received information only to the group of user devices during the predetermined time period. The information comprises at least one of geographic locations of the group of user devices and imagery taken by one or more of the group of user devices during the event.

In one example, the server apparatus comprises instructions executable by the processor for automatically registering and distributing an initial location of the group of user devices when the predetermined time period begins.

In another example, the server apparatus comprises instructions executable by the processor for determining a user interface active on a respective one of the group of user device, wherein the user interface comprising at least one of a calendar application, a map application, and a social networking application; and sending the received information to the active user interface for presentation to the user.

In a further example, the server apparatus comprises instructions executable by the processor for receiving a privacy setting from a respective user device of the group of devices; and disallowing the information related to the respective user device to be transmitted to the other user devices in the group based on the received privacy setting.

In one alternative, the server apparatus comprises instructions executable by the processor for automatically ending sharing the information when the predetermined time period expires.

In another alternative, the server apparatus comprises instructions executable by the processor for receiving contact addresses associated with users of the group of user devices;

sending an invitation to respective ones of the received contact addresses upon the creation of the event; and receiving responses to the invitations from respective ones of the group of user devices, the responses comprising accepting the invitation or declining the invitation.

In a further alternative, the server apparatus comprises instructions executable by the processor for distributing a request for consensus along with a piece of the received information; receiving responses from one or more of the group's user devices responding to the request; generating, based on the received responses, updated information related to the event; and distributing the generated information to the group of user devices.

In one example, the server apparatus comprises instructions executable by the processor for receiving permission settings from one or more of the user devices in the group; and distributing, after the predetermined time period expires, contact information related to the one or more user devices to other user devices in the group based on the received permission settings.

In yet another embodiment of the invention, a device for providing real time information sharing is provided. The device is configured to communicate with other devices on a peer to peer communication protocol. The device comprises a user input device; a processor in communication with the user input device and configured to process information received from the user input device; and a memory coupled to the processor. The memory storing instructions executable by the processor for receiving, from the user input device, user input indicating a request to create an event and to share information among a group of devices only within a predetermined time period; receiving information from each respective user device in the group during the predetermined time period; and distributing the received information only to the group of user devices during the predetermined time period, wherein the information comprises at least one of geographic locations of the group of user devices and imagery taken by one or more of the group of user devices during the event.

DETAILED DESCRIPTION

In accordance with aspects of the invention, a system of real-time information sharing provides a platform to share data for the participants of a specific event through the participants' mobile devices. In an aspect, the sharing automatically may end with the event. According to one example, a server receives a request from a user device to share information among a predetermined group of user devices during a predetermined time period. The user devices participate in a common activity during the predetermined time period. The information comprises information related to the common activity and information related to a respective user device including geographic information of the device. The server receives the information from the user devices during the predetermined time period and publishes the information to the user devices during the predetermined time period.

Aspects, features and advantages of the invention will be appreciated when considered with reference to the following description including exemplary embodiments and accompanying figures. The same reference numbers in different drawings may identify the same or similar elements. Furthermore, the following description is not limiting; the scope of the invention is defined by the appended claims and equivalents.

Figure 1:
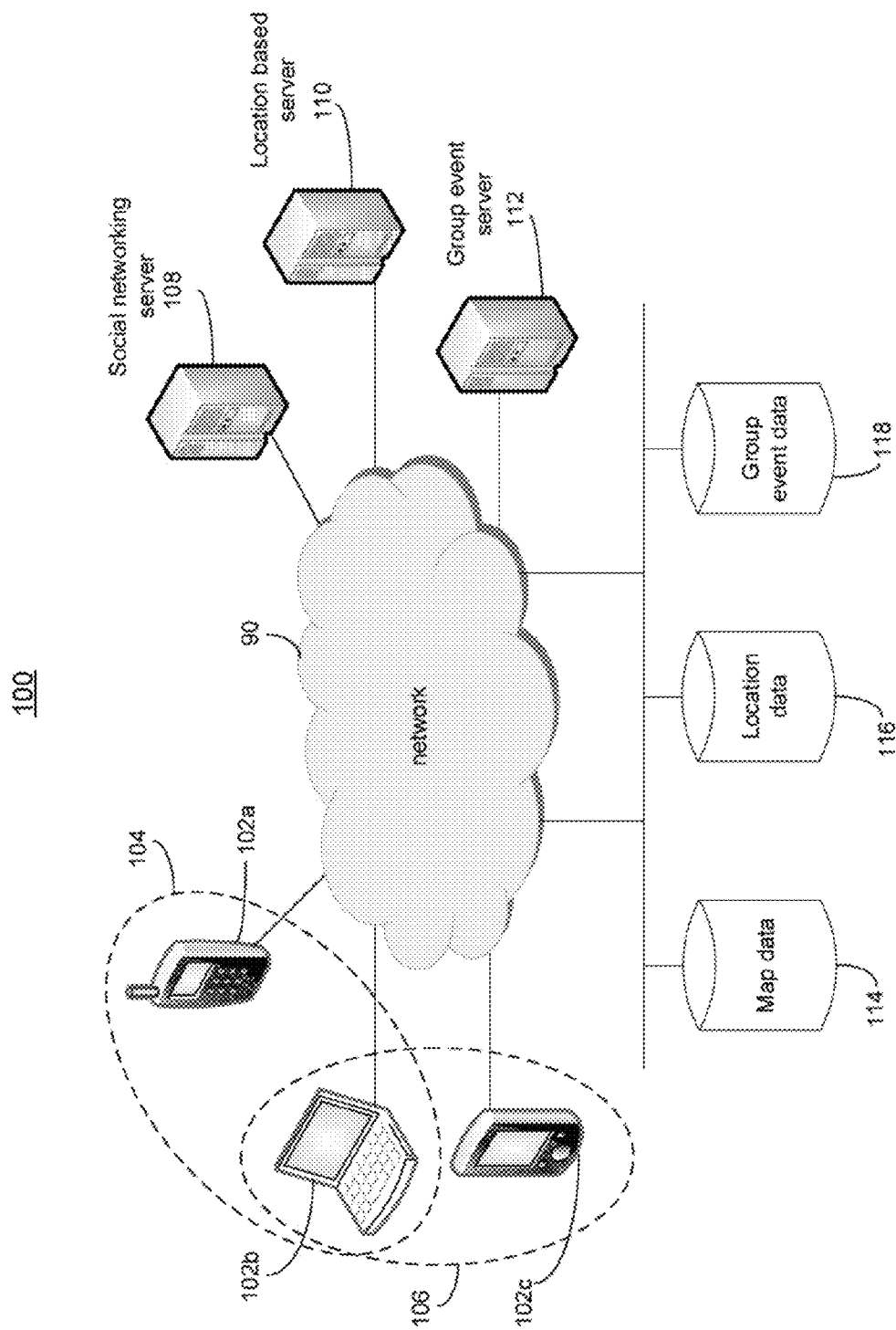
FIG. 1 is a diagram of a network environment in accordance with aspects of the invention.

FIG. 1 illustrates an exemplary environment in accordance with one aspect of the invention. System 100 may include network 90, user devices 102a, 102b and 102c, servers 108, 110 and 112, and databases 114-118. The user devices may communicate with each other and with other network elements through network 90. The user devices may comprise mobile devices capable of wirelessly exchanging data with a server over a network such as the Internet. By way of example only, a user device may be a cellular phone such as 102a, or a laptop 102b, or a wireless-enabled PDA 102c, or any other mobile device capable of obtaining and sending information via network 90.

Some of these user devices may be used to participate in a common activity and may therefore share information (e.g., locations and dialogues) with others participating the same activity for the duration of the common activity. For example, user devices 102a and 102b may participate in activity 104 and the information sharing between the two devices lasts with activity 104. User device 102b and 102c may be participants of activity 106 and the information sharing between the two devices lasts till activity 106 ends. The information shared between user device 102b and 102c for activity 106 is desirably not shared with participants of activity 104.

In the meet-up scenarios such as activity 104 or 106, besides sharing information, participants may also want to collaboratively work in the activity. For example, a group of biking trip participants may not only want to share their locations, but also want to share and contribute to a common set of navigation directions to reach a certain destination. The participants may want to change the existing routes, add new vista points, detours etc, and make these changes immediately visible to all the participants. The participants may also want to share various other types of information such as still images and video (collectively, "imagery") taken during the activity.

Network 90, and any intervening nodes therein, may comprise various configurations and use various protocols including wide area networks, local area networks, personal area networks, virtual private networks, private networks using communication protocols proprietary to one or more companies, cellular and wireless networks such as 3G, 4G and Wi-Fi networks, and various combinations of the foregoing.

Network elements that communicate with the user devices may include the servers 108, 110 and 112. Each server may comprise one or more computers that provide various types of services to the user devices. For example, server 108 may be a computer configured to perform various functions related to social networking for the user devices. Server 110 may be a computer configured to provide location based services such as navigations and location-aware advertisements.

Server 112 may be a computer configured to provide group event management and information sharing to facilitate a group of users collaborating in the common activity in accordance with aspects of the invention. In FIG. 1, although only one server for performing group activity tracking and information sharing is depicted (e.g., server 112), the various functions related to facilitating users to collaborating in a group activity may be performed on different servers that are distributed through the network 90.

Server 112 may utilize service information provided by other servers. For instance, the group event management service may display, on the user devices, a route taken by the activity participants on a map service provided by server 110. Other service providers may also utilize the group activity service of server 112. In another example, the group event and information sharing application may be displayed with the user interface of a social networking service, such as Google Latitude, provided by server 108, or in a personal organizer such as Google Calendar. Although not shown, the user devices 102-106 may also receive services from a plurality of other computer servers that may provide media services, messaging services, news services, developer services, etc. Data related to these services may reside on the server that provides the respective service, or may reside in databases distributed over the network, such as databases 114, 116 and 118.

For example, database 114 stores map-related information such as map tiles, where each tile comprises a map image of a particular geographic area. The various map tiles are each associated with geographical locations, such that the servers and/or client device are capable of selecting, retrieving, transmitting, or displaying one or more tiles in response to receiving one or more geographical locations.

A single tile may cover an entire region such as a state in relatively little detail and another tile may cover just a few streets in high detail. In that regard, a single geographic point may be associated with multiple tiles, and a tile may be selected for transmission based on the desired level of zoom. The map information is not limited to any particular format. For example, the images may comprise street maps, satellite images, or a combination of these, and may be stored as vectors (particularly with respect to street maps), bitmaps (particularly with respect to satellite images), or flat files.

For another example, database 116 may store location data. Locations may be expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing.

Locations may be further translated from one reference system to another. For example, the user device 160 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, it will be understood that exchanging or processing locations expressed in one reference system, such as street addresses, may also be received or processed in other references systems as well.

Database 118 may store data related to group activities, such as start and end times of a specific group activity, participants of the activity, access restrictions related to each participant, visibility options and activity statistics, etc.

Figure 2:
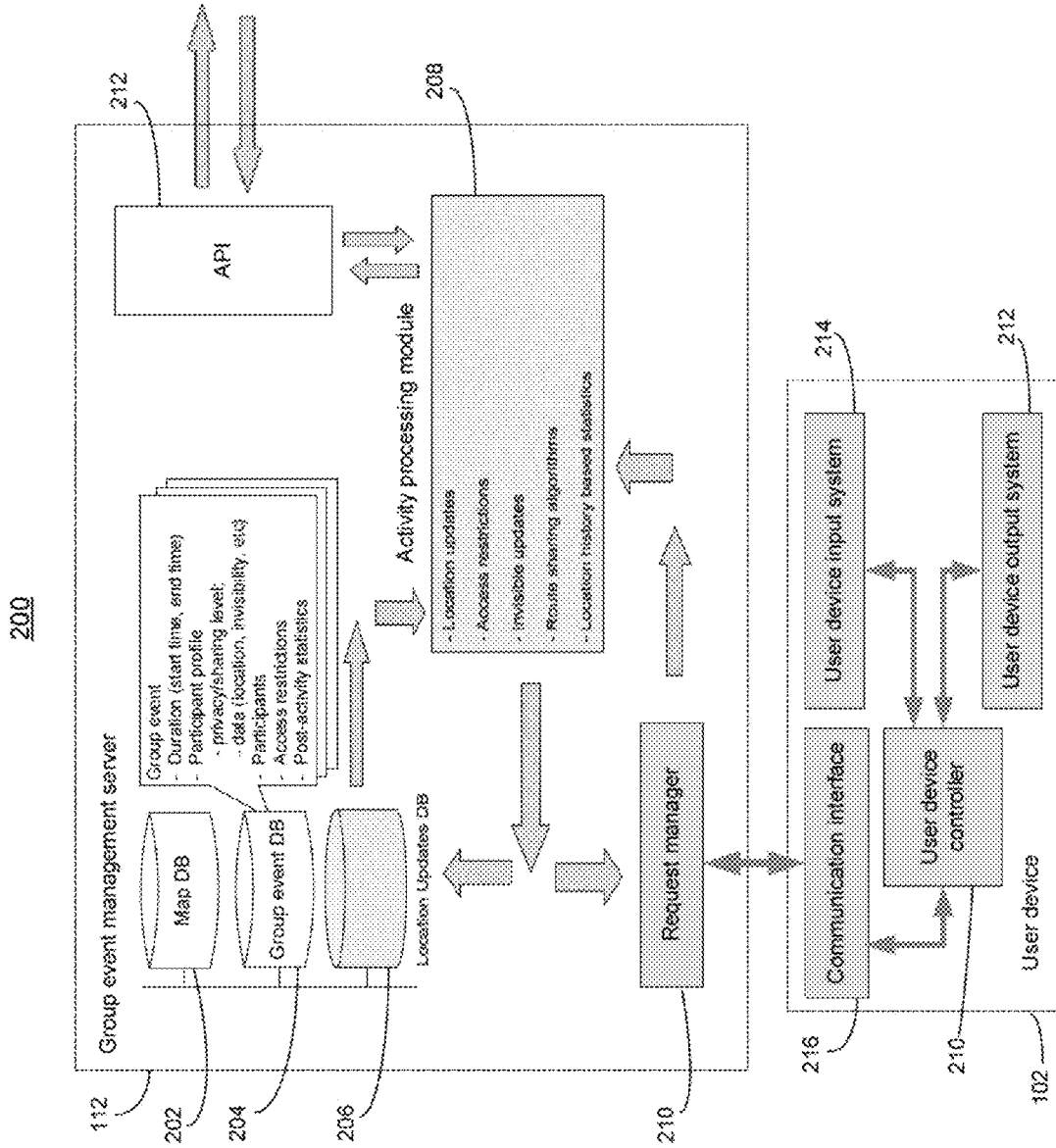
FIG. 2 is a system block diagram in accordance with the system of FIG. 1.

FIG. 2 illustrates an exemplary system implementation 200 in accordance with aspects of the invention. Group event management server 112 may be a computer server that houses one or more databases (e.g., map database 202, group activity database 204 and location updates database 206), an activity processing module 208, a request manager 210 and an Application Programming Interface (API) module 212.

The databases may be SQL-based databases or any other storage system for structured data. Group activity database 204 may store per activity data such as start and destination points, proposed routes, directions, duration time, participants, and access restrictions (e.g., allow or disallow non-participants to join or view the activity), etc. Per activity data may also include participant profiles and statistics or summaries regarding the group event. Participant profiles may include a trail of location data of the respective user device during the activity, privacy settings such as visibility modes, and contact details, etc.

Alternatively, location data of the user devices may be stored in the location updates database 206. The location updates may be sorted by time or in other order in the database. These updates are received from respective user devices and are propagated to other participants of the event based on the privacy settings associated with the respective user devices. The location data may be utilized by the activity processing module 208 to enable post-activity statistical computations and visualizations of the activity results.

Activity processing module 208 desirably stores programs, routines and algorithms to facilitate the participants to manage the group event and share information. For example, the processing module may determine which data is to be shared by which user devices based on the sharing restrictions associated with the data and the devices. The processing module 208 may also perform functions related to post-activity statistical processing, visualization and presentation of the results to the user devices. Although only one block module is illustrated, it should be understood that more than one functional module may perform various processing functions and may be included in the server.

Request manager 210 functions as an interface module between the user devices 102*a-c* and the other modules/databases associated with the server. For example, the request manager may channel various user activity requests to the appropriate processing modules, send the requested information to the right user devices, and distribute the event information to the event participants.

API 212 may be provided by the server to allow third-party application developers to utilize the group activity server platform and create desired new applications. These applications may include user interfaces for creating an activity and inviting participants, applications for managing events, and applications to utilize the activity data (e.g., a video creation application using the route traveled during the activity and images taken by the participants along the route).

A user device such as device 102 may comprise a device controller (processor) 210, output system 212 and input system 214. User of the device 102 may enter various user activity requests through the input system 214 (e.g., a keyboard, touch screen or mouse). The device controller 210 may process the requests and send the requests through a communication interface 216 to the server 112. The device controller 210 may also receive information from the server and present it to the user through the output system 212, for example, by displaying a chart of the activity result on a display screen of the user device 102.

Figure 3:
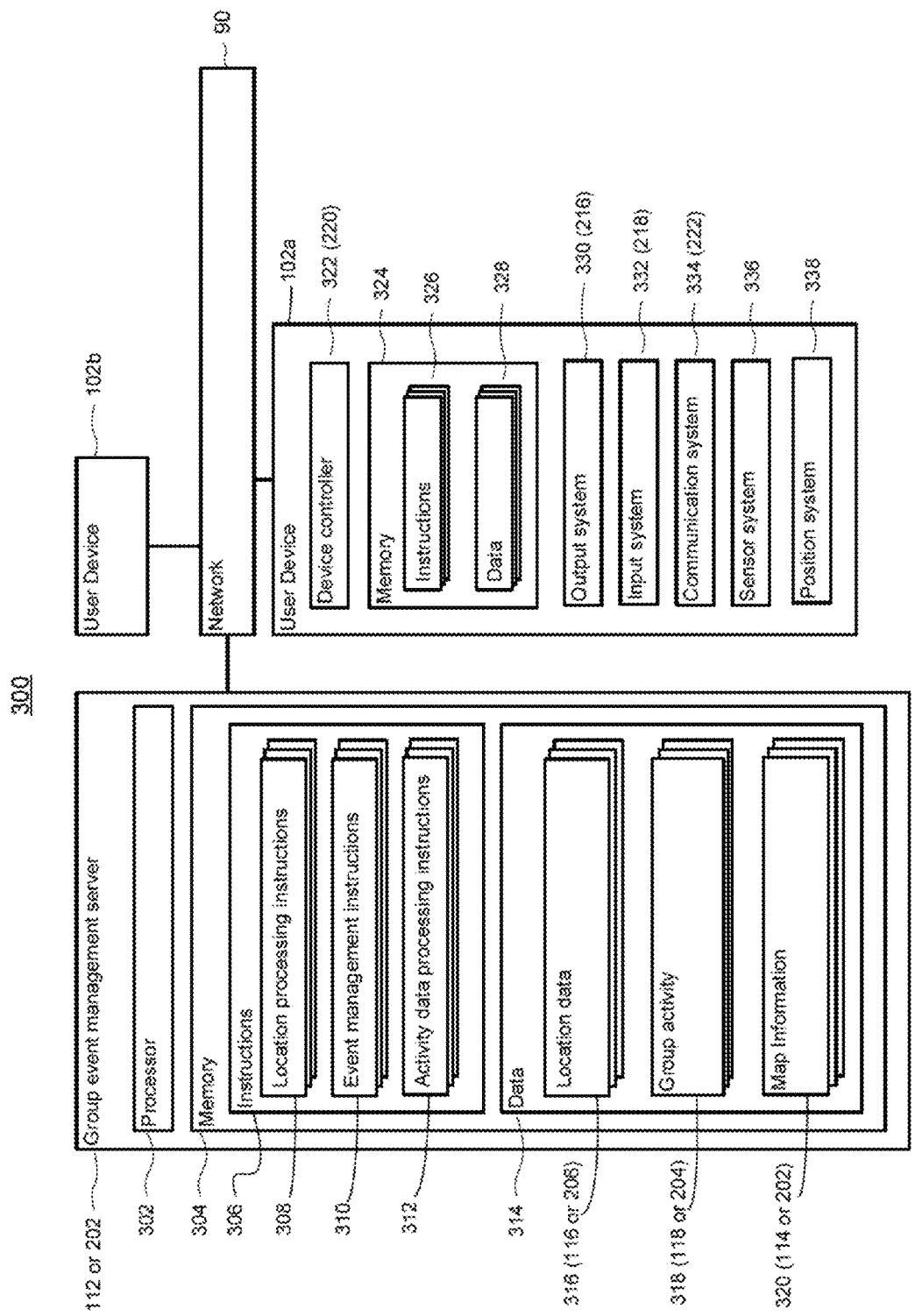
FIG. 3 is a functional diagram in accordance with FIGS. 1 and 2.

FIG. 3 shows another exemplary system 300 that comprises a group event management server 112 (or 202), and user devices 102a-b connected to the server through network 90. As illustrated, server 112 may be a computer that includes a processor 302, memory 304 and other components typically present in general purpose computer servers.

The processor 202 may be any conventional processor, such as off the shelf processors from Intel Corporation or Advanced Micro Devices. Alternatively, the processor may be a dedicated controller such as an ASIC. Although FIG. 3 functionally illustrates the processor and the memory as being within the same block, the processor and the memory may actually comprise multiple processors and memories that may or may not be stored within the same physical housing. For example, the memory 304 may be one or more hard drives or other storage media located in a server farm of a data center. Accordingly, references to a processor, a computer or a memory will be understood to include references to a collection of processors or computers or memories that may or may not operate in parallel.

Memory 304 stores information accessible by processor 302, including instructions 306 that may be executed or otherwise used by the processor 302. It also includes data 314 that may be retrieved, manipulated or stored by the processor. The memory may be of any type capable of storing information accessible by the processor, including a computer-readable medium, or other tangible medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 306 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Furthermore, methods and routines of the instructions may include, for example, various programs or functions such as location processing instructions 308, activity collaboration instructions 310 and activity data processing instructions 312.

Location processing instructions 308 are used by the processor to receive location updates from user devices, distribute the updates and process the historical location data. The event management instructions 310 may be used by the processor to perform functions such as receiving activity setup request from an activity administrator, sending invitations to designated invitees of the activity, receiving and processing various user requests or settings, and distributing the event data and the location data to the user devices. Instructions 312 may be used by the processor to perform various types of post-activity processing and publishing these computations on the user devices in the forms of graphs, tables, videos etc.

Data 314 may be retrieved, stored or modified by processor 302 in accordance with the instructions 306. For instance, although the system and method is not limited by any particular data structure, the data may be stored in computer registers, in a relational database as a table having a plurality of different fields and records, XML documents or flat files. The data may also be formatted in any computer-readable format.

As shown, data 314 may comprise location data 316 of the database 206 obtained from the user devices. Group activity data 318 may comprise per activity data of the group event database 204 described above with FIG. 2. Map information 320 may also reside on server 302. This data may comprise data of the map database 202, and may be further utilized by other servers to provide applications and services to the user devices, such as the social network server 108 and the location-based server 110 shown in FIG. 1.

The server 112 may be at one node of network 90 and capable of directly and indirectly communicating with other nodes of the network. For example, server 112 may be a web server capable of communicating with client devices 102a and 102b via the network 90 such that server 112 uses network 90 to transmit and provide information to the user using client devices 102a-b. Server 112 may also comprise a plurality of computers that exchange information with different nodes of a network for the purpose of receiving, processing and transmitting data to the client devices; in this instance, the user devices will typically still be at different nodes of the network than any of the computers comprising server 302.

User devices 102a and 102b may be mobile devices similar to devices 102a-c as described with regard to FIGS. 1 and 2. Each user device may be configured with one or more device controller 320 (similar to the device controller 220 in FIG. 2) such as a central processing unit (CPU), memory 324 (e.g., RAM and internal hard drives) and all of the components normally used in connection with a mobile device.

The memory may store instructions 326 and data 328. Instructions 326 may include various sets of instructions executable by the device controller 322 and typically found in a mobile device, such as operating system instructions (e.g., Android, Symbian, Windows Mobile), phone instructions for handling phone-related processes and functions such as text messaging, graphical user interface instructions, user application program instructions such as a web browser, location instructions for receiving and sending location data, peripheral device instructions to control various input, output and sensor systems on the mobile device, etc. Data 328 may store various types of data accessible by the processors and instructions to facilitate system operations and application executions.

Various peripheral components on the user device 102a are coupled to the processor and the memory through data bus lines and signal lines. Instructions to facilitate the operations of these components are stored in the memory. These peripheral components include output system 330 and input system 332 (such as the output system 216 and input system 218 described in FIG. 2). Output system 330 may comprise an electronic display for visual output (e.g., a small LCD touchscreen or any other electrical device that is operable to display information) and one or more speakers for audio output. Input system 332 may comprise input devices such as keyboard, touch-screen, buttons, thumb-wheel, pointer device, ports (USB, infrared) and/or microphone.

A communication system 334 enables the user device to communicate with one or more types of networks, such as cellular network, 802.x networks, etc. The communication system 334 may comprise network interface devices and associated controllers or drivers, e.g., transceiver and antenna, as well as all of the components used for connecting these elements to one another.

The user devices may also include sensor system 336 (e.g., infrared sensors) and position system 338. The position system comprises one or more geographic position components to determine the geographic location and orientation of the device. The approximate location of the client's device may be found with a number of different technologies.

For example, user device 102a may include a GPS receiver to determine the device's latitude, longitude and/or altitude position based on satellite signals. The client device may also transmit the geolocation information from a GPS device or device with GPS capabilities to a location server during its connection with the client device in conformance with communication protocols. For example, the device may use a browser such as Google Chrome or the browser of the Android operating system, each of which may be configured with user permission to send GPS information to trusted network sites.

The location server may use this information to determine a location of the client device. Because the accuracy of GPS determinations may depend on the quality of the device and external factors such as environment, the device may further transmit data indicative of accuracy. For example, user device 102a may inform the location server that the transmitted latitude/longitude position is accurate to within 100 meters, i.e., the device may be at any location within 100 meters of the transmitted position. The server may also assign a level of accuracy in the absence of such information.

In another example, the user device or a location server may extrapolate geographic locations based upon information received from client devices. For example, location data may be received at the user device indicating a potential location of the device. The location data may include an exact point, a set of points, a distance from a point, a range of points, or arbitrary boundaries, such as streets, cities, zip codes, metropolitans, statistical areas, counties, states or the like. The location data may be used to determine a range of accuracy of the position or area in which the user device may be located.

The geographic position component may also comprise software for determining the position of the device based on non-satellite signals received at the client device 102a, such as signals received at the antenna from one or more cellular towers or Wi-Fi access points. The position system may also include an accelerometer, gyroscope or other device to determine the direction in which the device is oriented. In that regard, it will be understood that a client device's provision of location and orientation data as set forth herein may be provided automatically to the user, to the server, or both.

Another location technology employs triangulation among multiple cellular towers to estimate the device's position. Further location technologies include IP geocoding and RF fingerprinting. With these techniques, the IP address of the user device 102a on a data network or detected wireless transmitter's ID may be mapped to a physical location or location range. As noted before, locations may be provided in any number of forms including street addresses, points of interest, or GPS coordinates of the user device.

These devices may be operated in accordance with instructions 326, and the instructions may be employed by the device controller to process data received from these devices. For example, instructions 326 may be used to estimate the location of the user device based on the time of arrival signals from multiple GPS satellites received by the GPS receiver. Instructions 326 may also perform calculations (e.g., triangulation) to estimate device location based on the received RF signals when it is determined that GPS signal is not available.

Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

Figure 4:
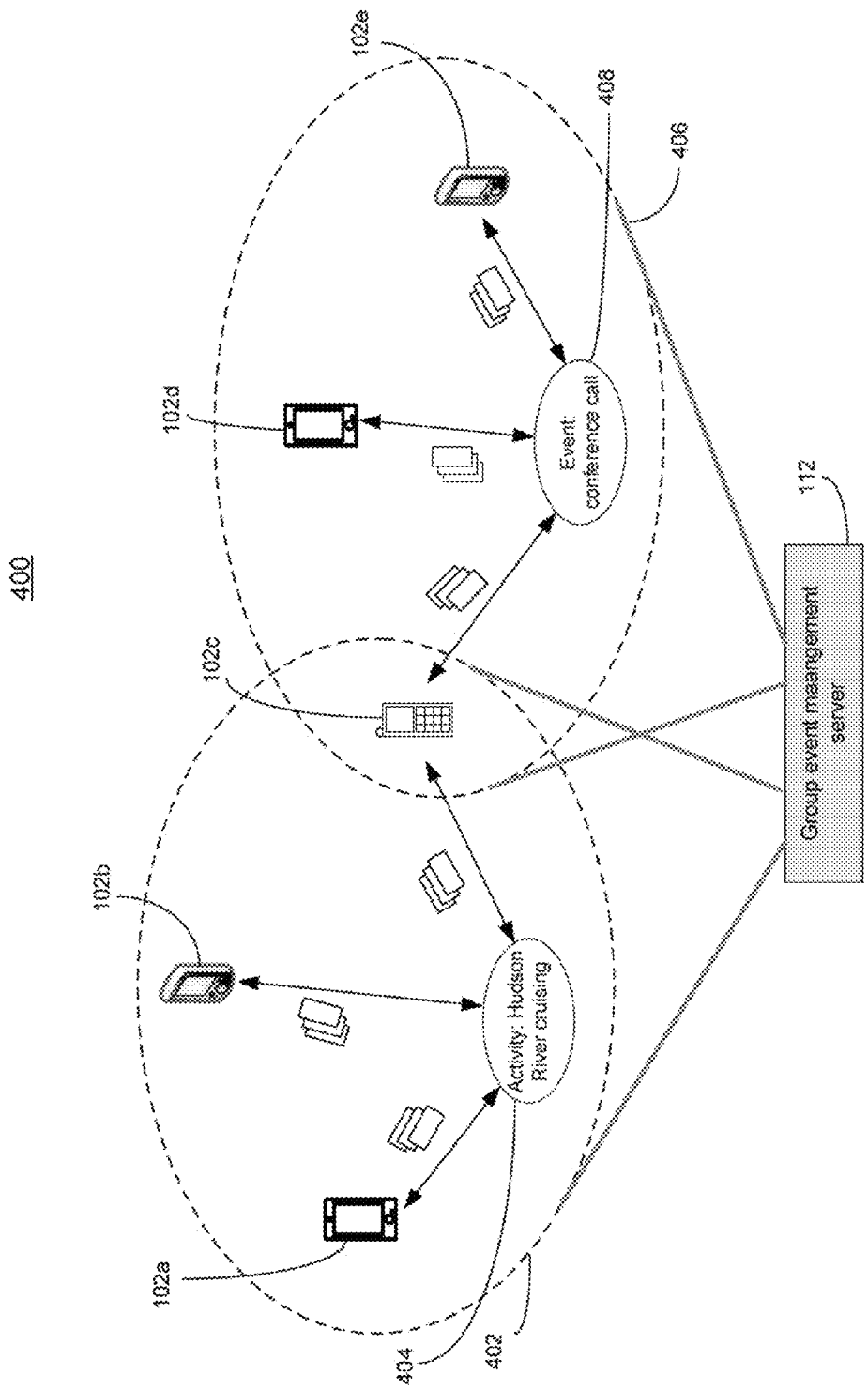
FIG. 4 is another exemplary scenario in accordance with aspects of the invention.

FIG. 4 illustrates an exemplary scenario 400 in accordance with aspects of the invention. A plurality of mobile device users may share their locations and other data on a per activity basis. The relevant activity creation, management and information sharing services for each activity may be provided by a group event management server 112 that communicates with the mobile devices 102a-e.

For example, event 404 ("Hudson River cruising") may be created for group 402 that includes user devices 102a, 102b and 102c. Event 408 ("conference call") may be created for group 406 including user devices 102c, 102d and 102e. As illustrated, user device 102c may be included in more than one groups and participate in more than one activities. Information shared among the user devices 102a-c for event 404 are not propagated by the server 112 to user devices 102c-e, and information shared among the user devices 102c-e for event 408 are not propagated to user devices 102a-c. Users are provided by the group event server with options to choose whether to share information on a per event basis. For example, user device 102c may share location information with other participants in activity 404 but not to share location information with other participants in activity 408. Information to be shared during an event is not limited to locations, but may include still pictures and videos (imagery), navigations, comments and various other types of information.

Figure 5:
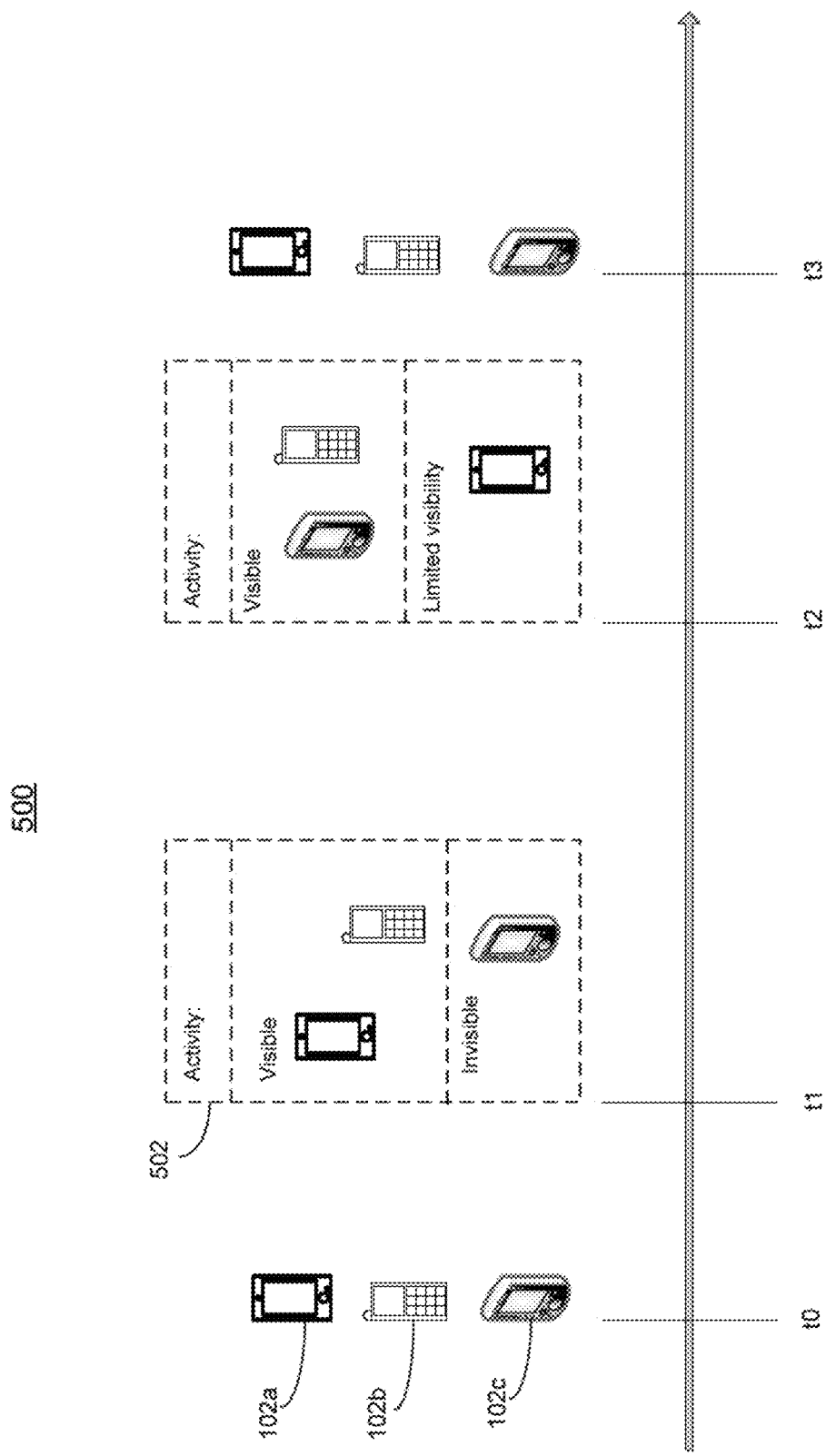
FIG. 5 is a further exemplary scenario in accordance with aspects of the invention.

FIG. 5 illustrates a scenario 500 where user devices 102a, 102b and 102c participate in activity 508. Data sharing among these user devices are desirably bound by the time limit associated with the activity. For instance, activity 502 is scheduled to start at time t1 and last until t3. The information sharing among the devices 102a-c is scheduled to be in parallel with the activity 502. Thus, at time t0, the user devices do not share data with each other and do not start sharing until time t1.

During the activity, each user device may specify its privacy or sharing level. For example, at time t1, devices 102a and 102b select to be on the highest level of information sharing such that their real-time locations are visible to all the other participants of activity 502. At the same time, device 102c selects an "invisible" mode so that other participants cannot see the location of device 102c at time t1.

At time t2, device 506 may opt out of the invisibility mode and change its location sharing level to be "visible-to-all". Device 504 may stay in the "visible-to-all" mode. Device 502 may change its location sharing level to a limited visibility mode. A limited visibility mode may further comprise various possible settings. For example, device 502 may select to be visible to certain user devices (e.g., device 504) but not others (e.g., device 506). In another example, device 502 may still make its location visible to all the participants of the activity, but at a lower update speed and longer intervals (e.g., every 15 minutes) instead of in real time. The limited visibility mode may also includes sharing locations at a coarser precision level (e.g., on a town level instead of the street level). At time t3, the data sharing among the devices desirably automatically ends when activity 508 comes to an end.

In other examples, the sharing may begin at a predetermined time before the event starts and ends at a specific time after the event ends. For instance, the information sharing among the user devices 502-506 may be scheduled to start ½ hour before t1 (when the event starts) and end 20 minutes after t3 (when the event ends). In further examples, the event management system may provide options to the participants to extend or shorten the original information sharing duration. The system may request consensus from other participants once it receives one participant's such proposal to extend or shorten.

Instead of automatically ending the sharing, the event management system may also send warnings to the user devices if the sharing period is longer than the predetermined time frame. Users may be provided with options to choose whether to end the sharing automatically or be notified when the sharing goes beyond the designated time.

Figure 6:
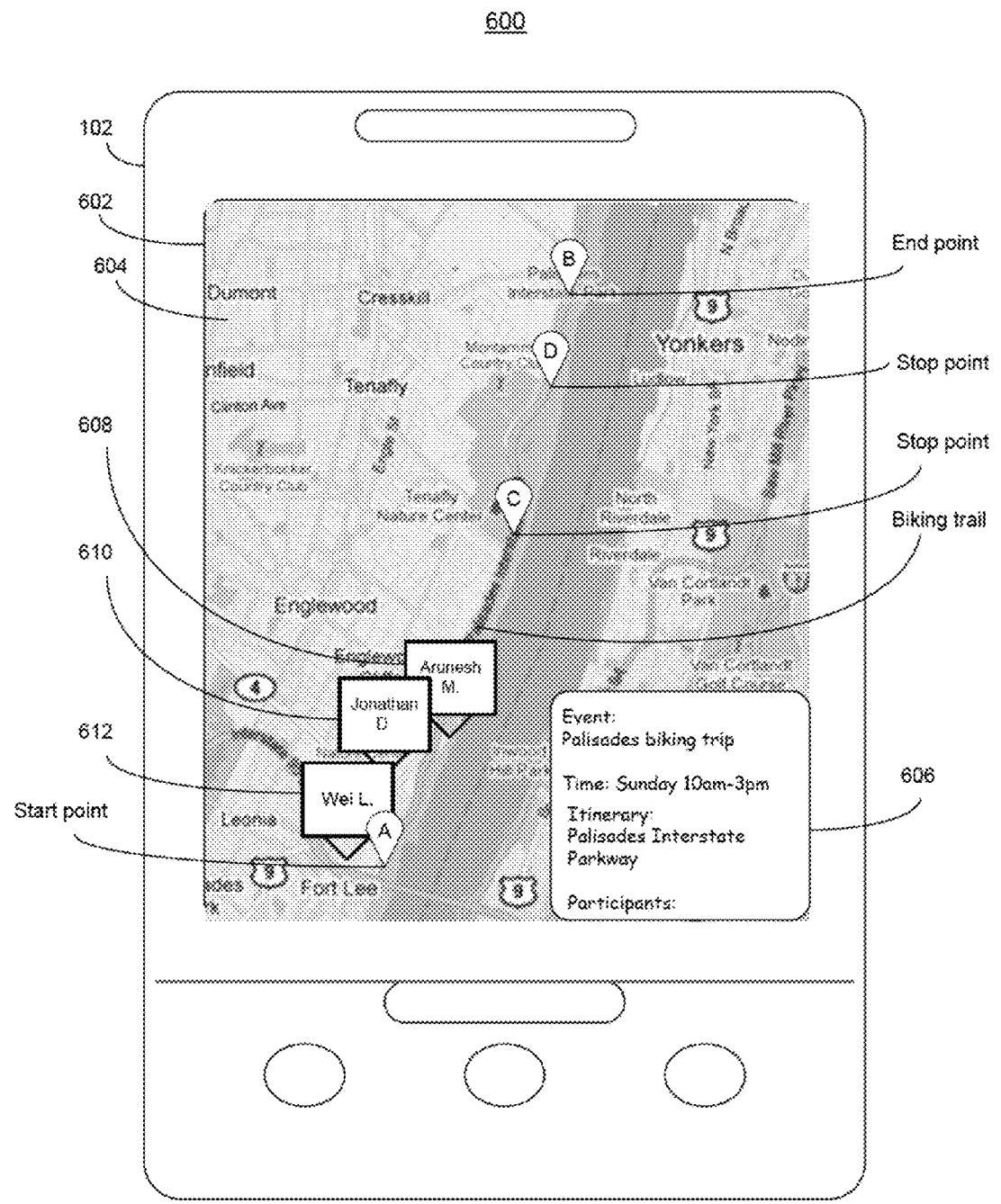
FIG. 6 is an exemplary user interface in accordance with aspects of the invention.

FIG. 6 illustrates the user interface of an activity scenario 600. Here, user device 102 has a map application 604 displayed on the screen 602. An event management application 606 is also displayed on the user device. The event ("palisades biking trip") may be scheduled to start from point A (at Fort Lee) and end at point B (at Palisades Interstate Park) on a biking trail along the Palisades Interstate Parkway. The event is intended to last from Sunday 11 am to 3 pm, and has participants 608, 610 and 612, namely Arunesh M., Jonathan D. and Wei L. The activity may include optional stop points C and D on the biking trail.

Aspects of the inventions as illustrated in scenarios 500 and 600 provide systems and methods of an event-based user information sharing during a predetermined time span. The sharing is contained within the participants of the event, and different participants may set different privacy levels to share data.

Figure 7:
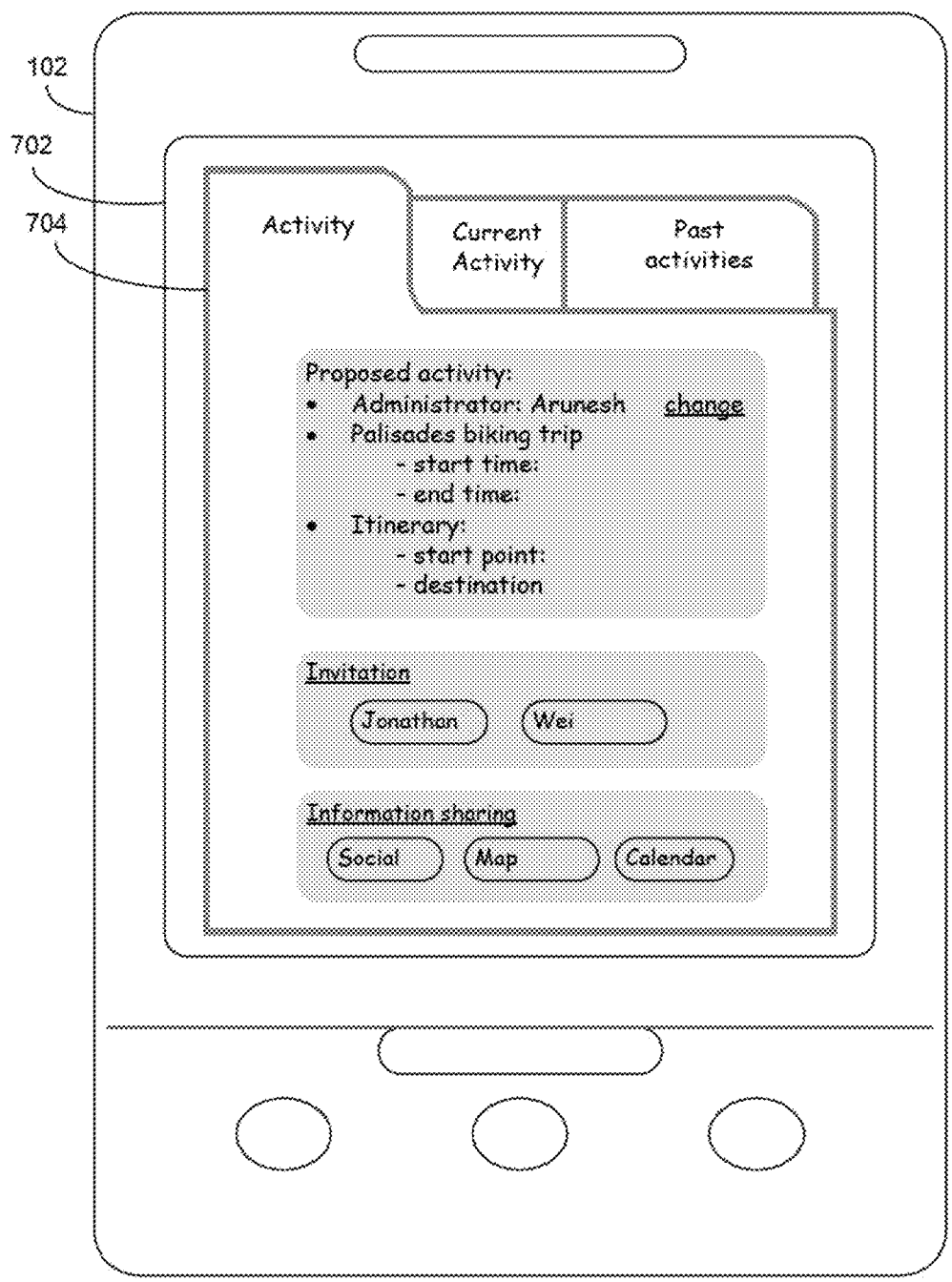
FIG. 7 is another exemplary user interface in accordance with aspects of the invention.

FIG. 7 illustrates a scenario 700 where a group event application operates in accordance with aspects of the invention. Here, the group event management application has a user interface 704 displayed on the screen 702 on a user device 102. As such, activities may be created and managed by the participants through the user interface 704.

The event management application may set, by default, the user who created an activity (e.g., Palisades biking trip) as the administrator of the activity. Alternatively, the event management application may provide options to designate, add and change administrator(s) before and during the activity. Upon the creation of an activity, other parameters may also be set such as the start and the end time, the proposed route with the start and destination points. Thus, user information sharing among the participants of the activity is contained during a predetermined time period that is between the start and the end times of the activity.

Through user interface 704, the user who initiated the activity, or any other user already present in the activity, can designate a group of users to participate the activity. The group event application may provide various ways to send the invitations such as email, text message, voice mail, notifications to social networking application or other mobile or location-based services. Invitations may be sent to the invitees manually by the event administrator, or be automatically sent by the event management application in the specific ways and at specific times selected by the administrator.

The group management application may also provide options to choose an application as a user interface for information sharing. For example, the invitation may be sent along with a proposal to share information through a social network application such as Google Latitude, or a map application such as Google Mobile Map, or a personal organizer such as Google Calendar. The invitees may accept the proposal, or use a different application to share information during the event. The group management application can work with various types of applications to provide seamless information sharing during an activity.

Figure 8:
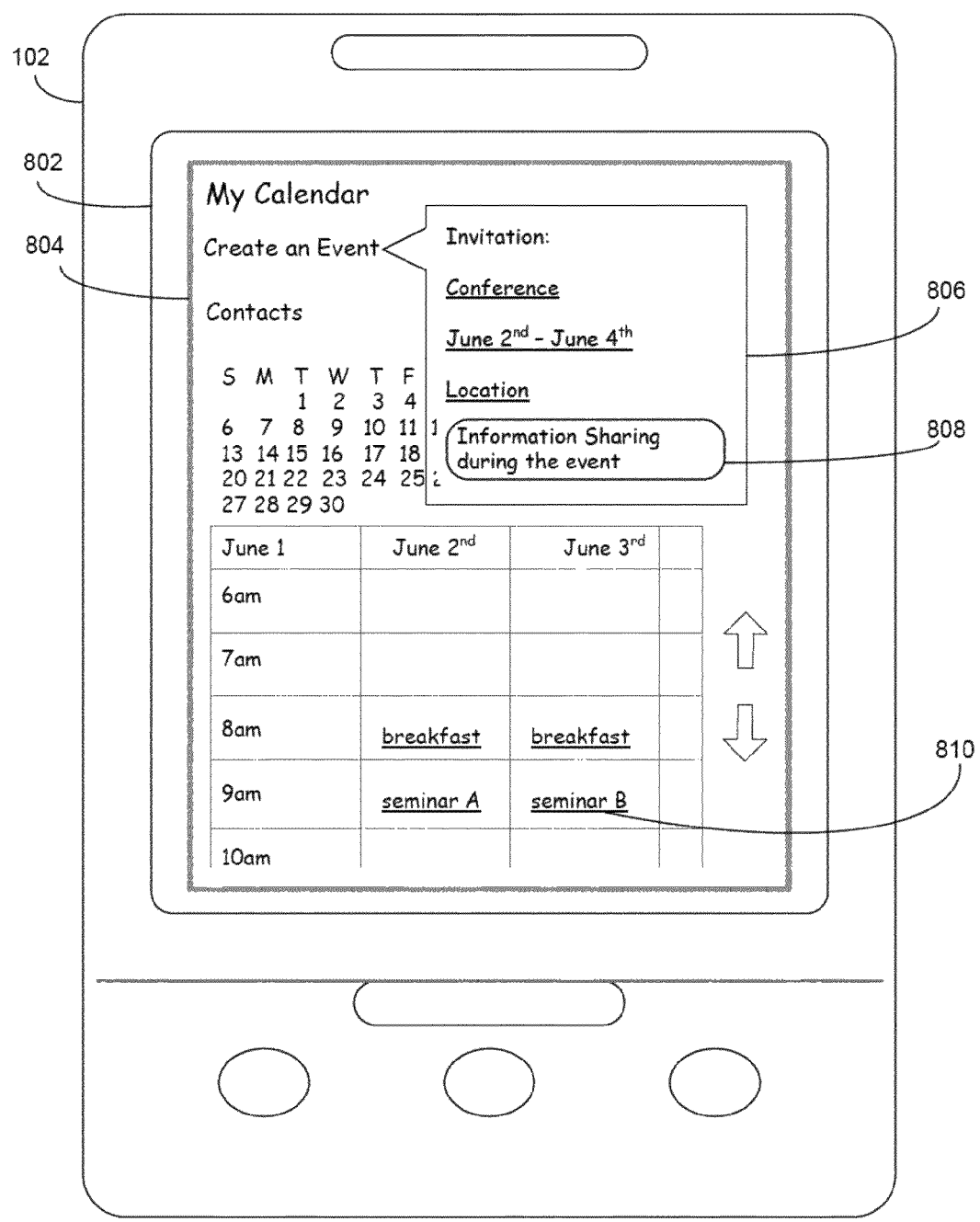
FIG. 8 is yet another exemplary user interface in accordance with aspects of the invention.

The group event management application may also be presented on the user device through a web interface such as a web site, or through other applications such as an Android-based mobile application. FIG. 8 illustrates an exemplary scenario 800 in which the group event management is integrated with a personal organizer application 804 on screen 802 of a user device 102. The personal organizer application may be a calendar-based application such as Google Calendar.

When a user creates an event in application 804, an option for managing information sharing during the event may be provided in the new event window 806. The option may be presented as a click-on button such as 808. The click-on button may trigger a detailed dashboard for managing event data sharing, such as user interface 704 in FIG. 7. This option may also be provided to manage an existing event, such as "seminar B" 810.

The default setting of sharing information during an event may be set as "yes" or "no" by the user in the event management application. Further detailed settings may be provided when the information sharing is set as "yes". These further settings may include when to start sharing (e.g., from the event start time, 15 minutes before the event), and when to end (e.g., at the event ending time, 10 minutes after the event ends).

Figure 9:
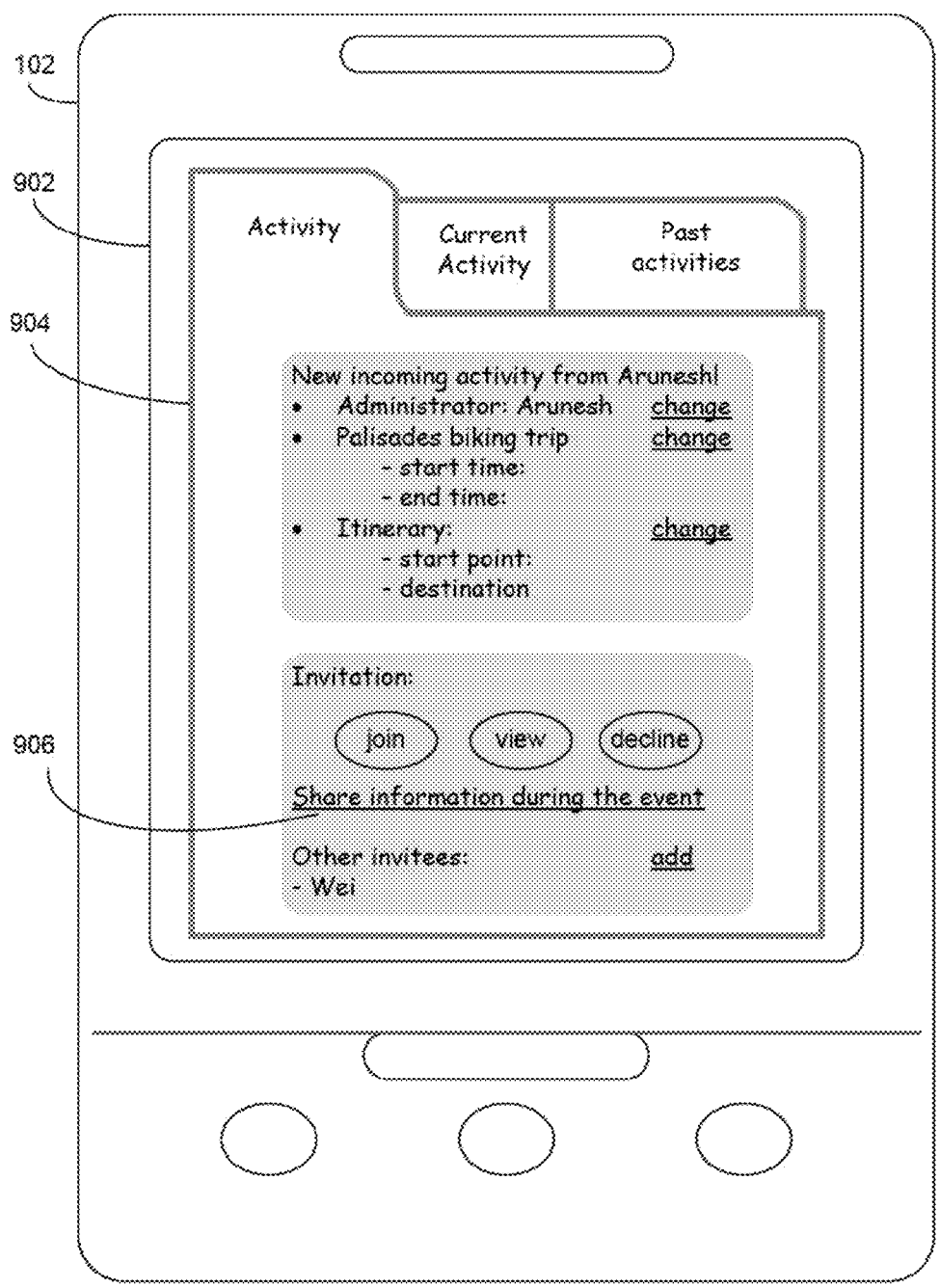
FIG. 9 is a further exemplary user interface in accordance with aspects of the invention.

FIG. 9 illustrates a further exemplary scenario 900 where the group event management application operates in accordance with aspects of the invention. User interface 904 of the group event application is displayed on screen 902 on the user device of a participant (e.g., participant Jonathan D) in scenario 900. The participant may view the proposed activity details and choose whether or not to accept the activity through the application. In addition, the administrator or the person who initiated the activity may also be provided with options to provide different invitees with different types of accessibility when sending out the invitations.

The group event management application may provide different options of how an invitee may be involved in the activity. For example, the options may include becoming a full participant so that the invitee may be able to share information and collaborate through the application with other participants and view other's information. Alternatively, the invitee may choose to become a viewer participant to observe the activity as it progresses. The administrator or the person who initiated the activity may provide different participants with different types of accessibility in the invitation. For example, participant Wei L. may be provided with only the option to join the activity as a viewer instead of as a full participant.

The information that may be viewed or observed by a participant during the activity may depend on the other participants' privacy settings as well as the common activity setting. Further details of information sharing may be highlighted or be provided through a link (e.g., link 906) in the invitation to help the invitees to find more about how to share information during the event.

The users may also be provided with options to join the activity in an anonymous way. For example, the group event application may allow the users to sign up for the event using a screen name so that other participants may only view the locations by screen name for the duration of the event. Contact details such as e-mail addresses may be hidden from the view of other participants by default. The users may also be provided with options to disclose their contact details to other participants.

The group event management application may also provide the participants with options to make changes to the original activity proposal. These options may include adding participants, changing administrators, changing the start/end time and the itinerary, etc. These changes may require consensus of all or part of (e.g., a quorum) the participants and/or the authorization by the administrator. If a group event invitation is sent without a proposed information sharing, the participants may be provided with options to propose such sharing to all the other group members.

Figure 10:
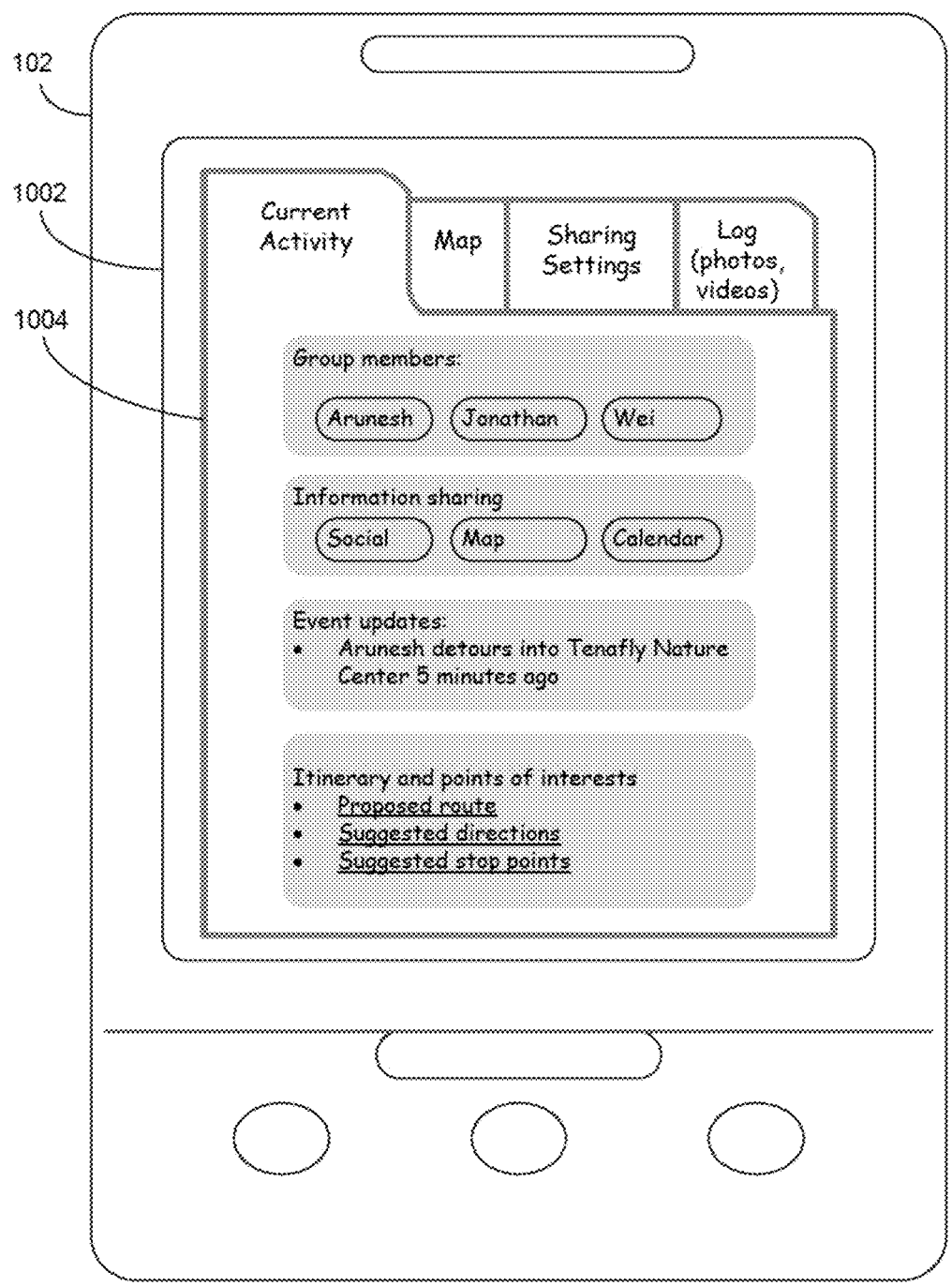
FIG. 10 is another exemplary user interface in accordance with aspects of the invention.

FIG. 10 illustrates another exemplary scenario 1000 where the event management application operates in accordance with aspects of the invention. During the course of a group activity, user interface 1004 may be displayed on screen 1002 of a participant's user device 102 and function as a dashboard for the users to collaborate through the current activity. Users may be provided with various types of sharing and privacy settings.

Upon the designated start time of sharing (e.g., when the activity starts or before the activity starts), the group event management system may first attempt to contact each of the participants to register their respective initial locations. Since the participants may use different user devices and different location-based applications may be active on the user devices, the group activity system is configured to provide the location updates through various types of applications running on different user devices.

For example, add-on applications for various types of browsers or gadgets may also provide location updates to the group activity system. For another example, a mobile map application running on a mobile phone may be used by the group activity system to provide location updates and display the scheduled route to be taken.

Figure 11:
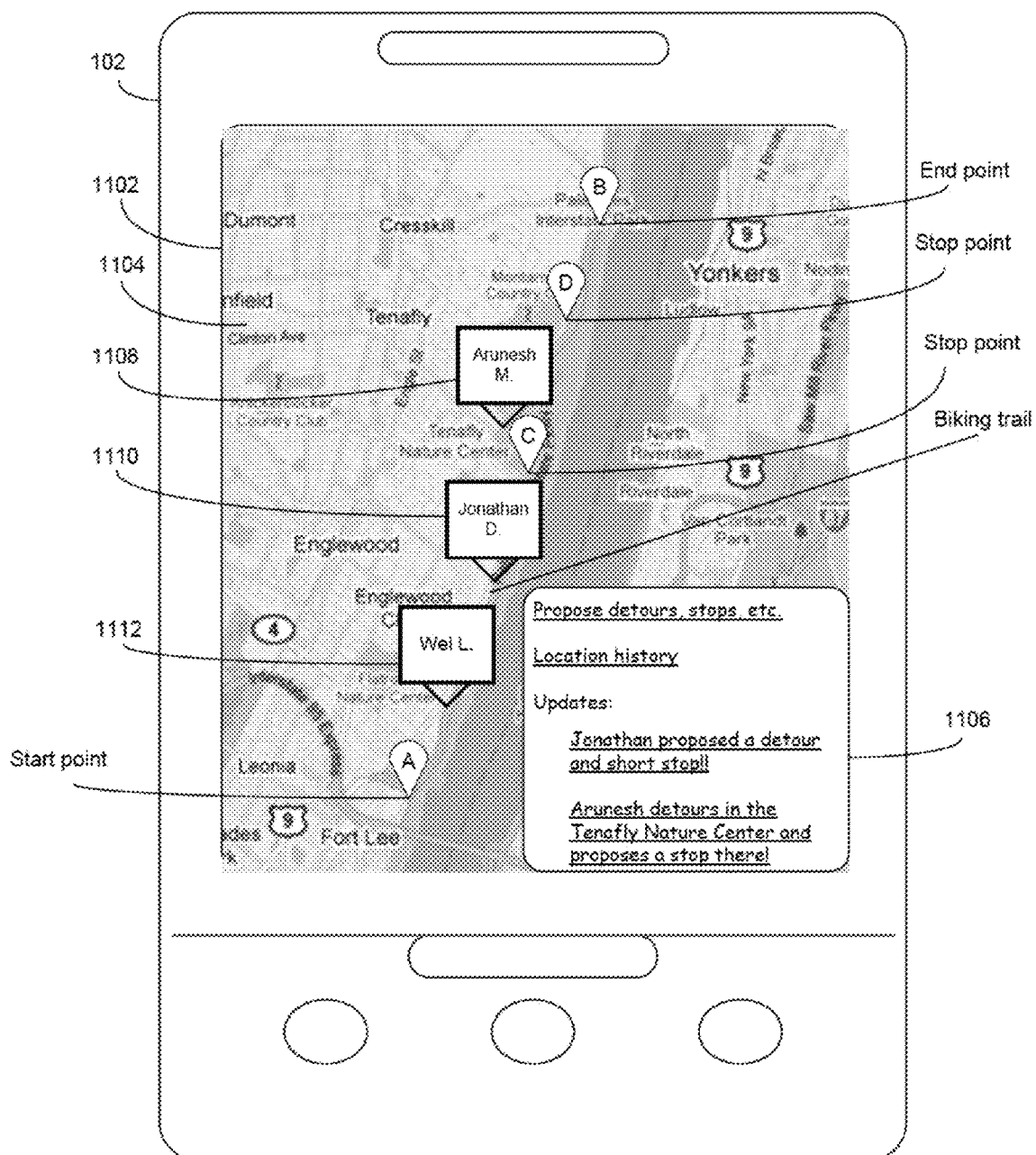
FIG. 11 is a further exemplary user interface in accordance with aspects of the invention.

Specifically, in FIG. 11, the biking route and the present participants' locations of the activity scenario 1100 may be displayed on screen 1102 through map application 1104 as well as an add-on user interface 1106 over the map application to enable the users to view the locations and manage the events (e.g., changing destinations and detours, etc.). The group event management system may also provide the users with options to display either the proposed route or the actual routes taken by the participants, or both☐ on the map application.

The group event management user interface may be displayed in various types of applications and web sites (e.g., process automation systems, social network sites, online forums) in various forms including an icon, a highlighted link, or a group of newly added friends.

The system may also provide participants to select among a variety of levels to share their location information. For example, a "visible" mode may enable all the participants to view the location updates and an "invisible" mode may block the location updates to other participants. A "limited visibility" mode may allow only certain people (e.g., the administrator or a selected group of participants) to view the location updates. Another variation of the limited visibility mode may allow the location updates to be propagated to other participants at a speed lower than real-time, for example, every 5 or 10 minutes. The group activity system may be configured such that a temporary invisible mode and the limited visibility mode require the authorization of the activity administrator.

The group event system may also automatically notify all or part of the participants of any detours taken by one of the group members. The system may provide settings to enable the participants to selectively propagate their detours to all the group members, or only a pre-designated group of people, or the administrator only, or no notification at all.

Information sharing during a group activity is not limited to the participants' location. The sharing extends to pictures taken by the participants, comments, suggested navigations and changes to the directions, proposals of new routes, additional destinations and stops, etc. The participants may makes these changes or proposals through a user interface (e.g., user interface 1006 or 1106) and these changes or proposals are reflected in real-time or near real-time on the other user devices. The group event system may require a certain type of consensus (e.g., by all the participants or the majority of the participants) or authorization from the administrator of the activity. Once a consensus or authorization is obtained, the system propagates the changes to all the user devices in the activity.

When an activity comes to an end, the users may be provided with options to delete their location history as well as any other location-tagged data. Alternatively, the location history from each participant may be assembled and processed into a trip report and be propagated to the participants.

Operations in accordance with aspects of the invention will now be described with reference to FIGS. 12 and 13. It should be understood that the following operations do not have to be performed in the precise order described below. Rather, various operations can be handled in a different order or simultaneously.

Figure 12:
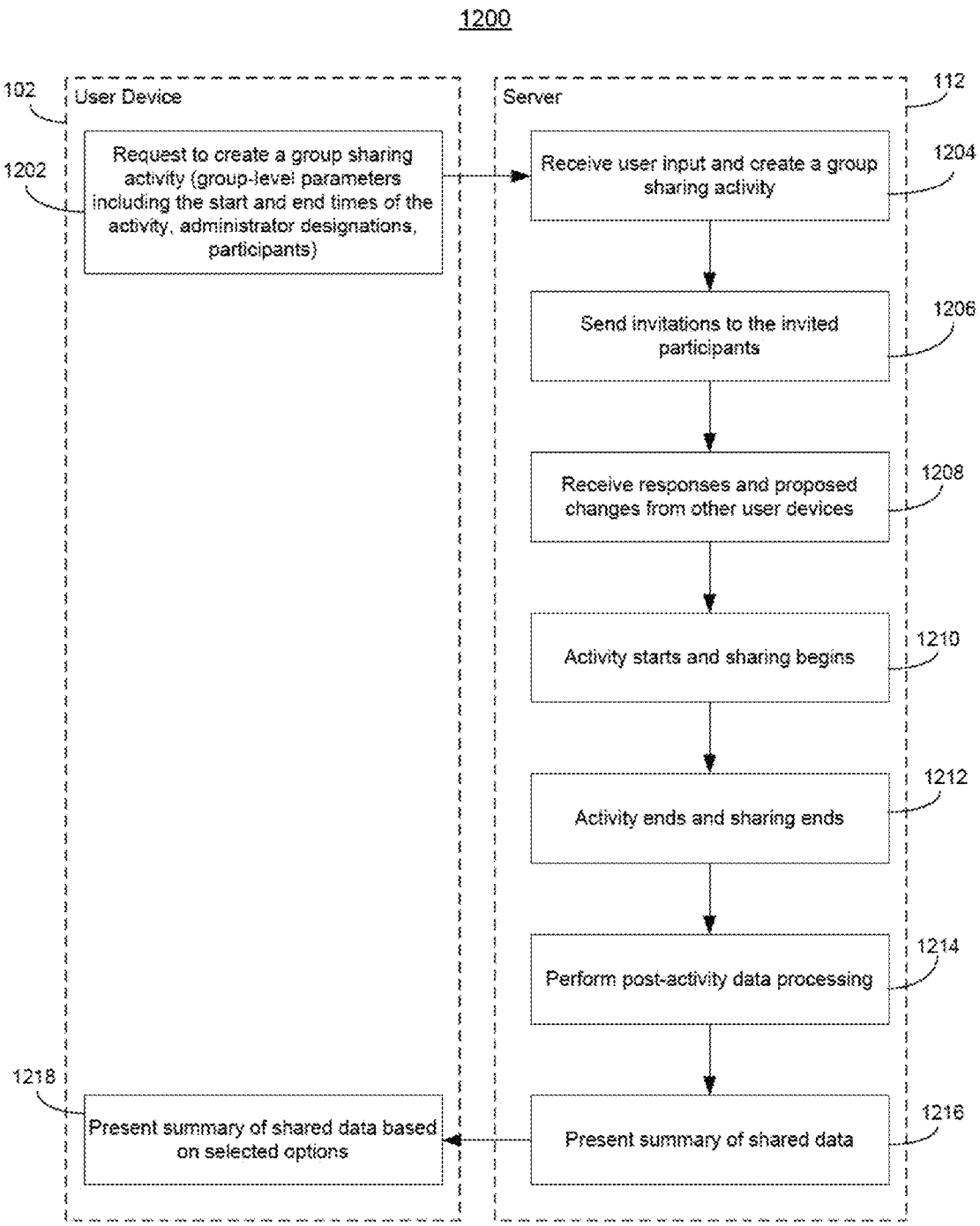
FIG. 12 is a flow diagram in accordance with aspects of the invention.

FIG. 12 illustrates an exemplary flow diagram in accordance with aspects of the invention. As shown, the process may start in block 1202, where a user device 102 makes a request to a group event management server 112 to create a group activity during which the participants of the activity may share their information. Various parameters related to the group activity may be specified by the user device at this step. For example, these may include the start and end time of the activity, place, routes, directions, stops, and a preliminary set of invitees to the activity. The user of the device may be designated as the administrator by default or may be designated otherwise by the user device 102.

The group activity is created by the server in block 1204, and in block 1206, the invitations including the proposed activity details may be automatically sent by the server to the invited users. The user who initiated the activity may specify the invitations be sent via e-mail, SMS, phone calls, etc. Besides the administrator designation and other activity-related parameters, options to change these parameters and to make new proposals are also propagated to the other users along with the invitation. In block 1208, the responses to the invitation and any proposed changes to the activity are received from other user devices.

The activity begins in block 1210 at the predetermined time, upon which the sharing desirably also starts and lasts till block 1212 where the activity ends. In block 1214, the group activity server performs post-activity data processing and presents this data in block 1216 to the participants' user devices in the form of charts, figures, videos, audio outputs etc. Each of the user device that receives the post-processed data, including user device 102, desirably presents the data to the participants in block 1218. Such information may subsequently be shared with non-participants.

Post-activity data processing and presenting may involve various calculation methods and types of user interfaces. For example, the location history may be presented as trails or videos showing each participant's locations over time on a map interface. Video creation may involve aggregating periodic location updates over a map image and may provide participants' comments (in a textual, audio or visual form) to be embedded in the video at various stages.

The location history may also be presented as charts or graphs to illustrate a distribution of time durations versus various locations. For example, when a group activity is a conference that lasts for one or more days, different rooms, floors or buildings within an area may be used as conference or seminar locations. Thus, post-activity processing may involve statistical calculations of the popularity or utilization rate of a room/floor/building, the average time a participant spends at each conference (as an indicator of the interest in the speakers' presentations or the seminar topic).

Figure 13:
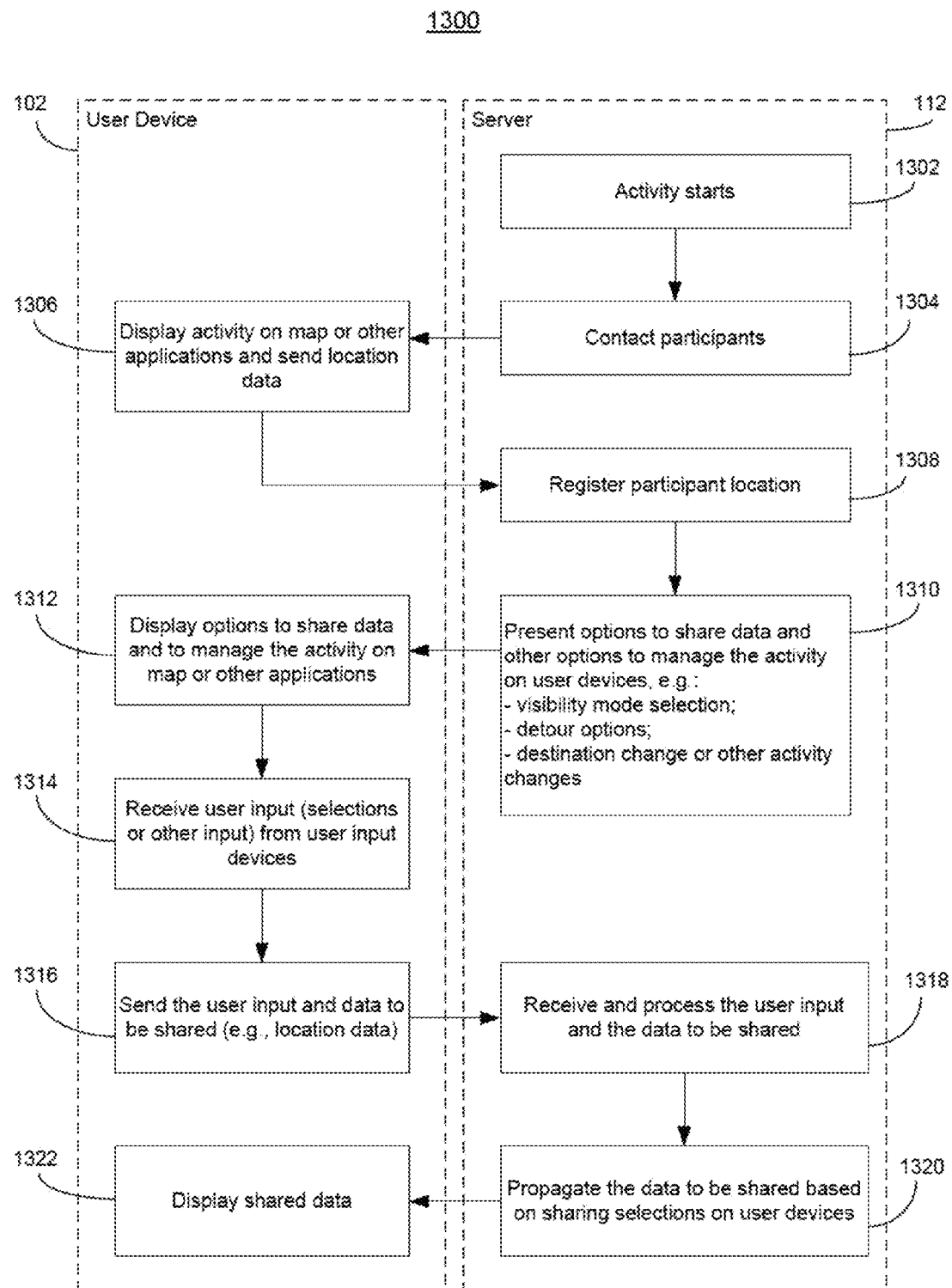
FIG. 13 is another flow diagram in accordance with aspects of the invention.

FIG. 13 illustrates an exemplary flow chart of the system's operation during an activity. The activity starts in block 1302 at the designated time and the server 112 contacts all the participants including user device 102 in block 1304 upon the beginning of the activity. Then, in block 1306, the group activity may be displayed on each of the user device. In block 1308, the server registers each participant's location.

During the activity, the group activity application presents the users with various options to share data and to collaborate through the activity. For example, in block 1310, the server may render the options like visibility mode selection, detour suggestion, destination change and a comment dialogue box to be displayed on the participants' devices. In block 1312, user device 102 displays these options through the user interface and in block 1314 the user device receives user inputs including sharing selections (e.g., a visibility mode selection) and data to be shared (e.g., locations, stop point suggestions, etc.) from the user input devices. Then in block 1316, the user device sends these inputs and the data to be shared to the server.

The group activity server processes the received user sharing selections and the data to be shared in block 1318. In block 1320, the server propagates the data to be shared to all or selected group members based on the received users' options. Each participant's device desirably presents the shared data accordingly in block 1322.

The group activity servers and the data transmission during the activity may be configured with various security and privacy measures. For example, during the activity, all communications between the users and the group activity servers are secured and use Secure Socket Layer (SSL) or any other cryptographic protocols to ensure a secure end-to-end data transmission at the transport layer. In another embodiment of the system, the information sharing may be based on a peer-to-peer communication system instead of a server-client system. In this situation, any suitable secure transmission mechanisms may be used in the peer-to-peer communication.

Since the information sharing is time sensitive and the sharing is desirably contained during the activity duration, a neutral and trusted source of time (e.g., an Internet time server) may be employed by the group activity server to thwart any attacks from participants who attempt to learn others' locations beyond the activity duration by resetting the time on their group activity applications.

In addition, the location history and other location-tagged data may be optionally purged after the activity ends. All location related data is desirably stored in an encrypted form during the activity and may be accessible only to the participants.

It will be further understood that the sample values, types and configurations of data described and shown in the figures are for the purposes of illustration only. In that regard, systems and methods in accordance with aspects of the invention may be used in connection with various types of user devices, may obtain the current user location from various types of position systems and location-based applications or services running on the user devices.

The invention may also be used with various data values, data types and configurations, and different methods and user interfaces for receiving user inputs, presenting the activity status and information intended to be shared. The data may be provided and received at different times (e.g., the post-activity processing functions may be later downloaded over networks, upon the users' selections, from associated servers or databases) and by different entities (e.g., some values and data may be pre-suggested or provided from different sources). Operations described as being performed on the device and data being processed on the device may be performed and processed on servers, other devices or various types of network entities in connection with the device, and vice versa.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, the event management application may be displayed through the user interface of various types of applications and web sites. For example, the locations of participants of an activity and the additional information about the participants and the activity may be displayed on a public web page. This is useful for public events such as hikes or marathons etc.

Various options of privacy or sharing settings may also be provided to the users. Similarly, the location updates may be obtained from many different servers, applications and location systems on the user devices. Any statistical algorithms for post-event data processing may be used with any of the configurations herein.

The real-time information sharing among a predetermined group of user devices within a predetermined period of time may also be implemented in a peer-peer fashion without the presence of a central server. Any suitable peer to peer communication protocol may be used. In this case, the group event management and information sharing system may reside on the various kinds of devices (e.g., mobile phones) used by the users. As such, systems and functions described above that are performed by a server may be performed by a user device.

The invention claimed is:

1. A method for providing information sharing, executable by a processor, comprising:
   receiving, from a first user device, a request to create an event and to share information among a group of user devices only within a predetermined time period associated with the event;
   receiving information from each respective user device in the group during the predetermined time period; and
   distributing the received information only to the group of user devices during the predetermined time period;

generating a summary of the event after the predetermined time period expires; and distributing the generated event summary to the user devices in the group, wherein the information comprises at least one of geographic locations of the group of user devices and imagery taken by one or more of the group of user devices during the event.

2. The method of claim 1, further comprising:

receiving contact addresses associated with users of the group of user devices;

sending an invitation to respective ones of the received contact addresses upon the creation of the event; and receiving responses to the invitations from respective ones of the group of user devices, the responses comprising accepting the invitation or declining the invitation.

3. The method of claim 1, further comprising receiving and publishing the received information for presentation through a user interface, wherein the user interface comprises at least one of a calendar application, a map application, and a social networking application.

4. The method of claim 1, further comprising:

receiving a privacy setting from a respective user device of the group of devices; and disallowing the information related to the respective user device to be transmitted to the other user devices in the group based on the received privacy setting.

5. The method of claim 1, further comprising automatically registering and distributing an initial location of the group of user devices when the predetermined time period begins.

6. The method of claim 1, wherein distributing the received information to the group of user devices further comprising:

distributing a request for consensus along with a piece of the received information;

receiving responses from one or more of the group's user devices responding to the request;

generating, based on the received responses, updated information related to the event; and distributing the generated information to the group of user devices.

7. The method of claim 1, further comprising automatically ending sharing the information when the predetermined time period expires.

8. The method of claim 1, further comprising sending a notification to each user device in the group when information sharing extends beyond the predetermined time period.

9. The method of claim 1, further comprising:

processing the information received during the predetermined time period, wherein the summary is based on the processed information.

10. The method of claim 1, further comprising:

receiving permission settings from one or more of the user devices in the group; and distributing, after the predetermined time period expires, contact information related to the one or more user devices to other user devices in the group based on the received permission settings.

11. A server apparatus for providing real time information sharing, comprising:

a processor;

a memory coupled to the processor, the memory storing instructions executable by the processor for:

receiving, from a first user device, a request to create an event and to share information among a group of user devices only within a predetermined time period;

receiving information from each respective user device in the group during the predetermined time period; and distributing the received information only to the group of user devices during the predetermined time period;

generating a summary of the event after the predetermined time period expires; and distributing the generated event summary to the user devices in the group, wherein the information comprises at least one of geographic locations of the group of user devices and imagery taken by one or more of the group of user devices during the event.

12. The apparatus of claim 11, further comprising instructions executable by the processor for automatically registering and distributing an initial location of the group of user devices when the predetermined time period begins.

13. The apparatus of claim 11, further comprising instructions executable by the processor for:

determining a user interface active on a respective one of the group of user device, wherein the user interface comprising at least one of a calendar application, a map application, and a social networking application; and sending the received information to the active user interface for presentation to the user.

14. The apparatus of claim 11, further comprising instructions executable by the processor for:

receiving a privacy setting from a respective user device of the group of devices; and disallowing the information related to the respective user device to be transmitted to the other user devices in the group based on the received privacy setting.

15. The apparatus of claim 11, further comprising instructions executable by the processor for automatically ending sharing the information when the predetermined time period expires.

16. The apparatus of claim 11, further comprising instructions executable by the processor for:

receiving contact addresses associated with users of the group of user devices;

sending an invitation to respective ones of the received contact addresses upon the creation of the event; and receiving responses to the invitations from respective ones of the group of user devices, the responses comprising accepting the invitation or declining the invitation.

17. The apparatus of claim 11, further comprising instructions executable by the processor for:

distributing a request for consensus along with a piece of the received information;

receiving responses from one or more of the group's user devices responding to the request;

generating, based on the received responses, updated information related to the event; and distributing the generated information to the group of user devices.

18. The apparatus of claim 11, further comprising instructions executable by the processor for:

receiving permission settings from one or more of the user devices in the group; and distributing, after the predetermined time period expires, contact information related to the one or more user devices to other user devices in the group based on the received permission settings.

19. A device for providing real time information sharing, the device being configured to communicate with other devices on a peer to peer communication protocol, the device comprising:

a user input device;
a processor in communication with the user input device and configured to process information received from the user input device; and
a memory coupled to the processor, the memory storing instructions executable by the processor for:
  receiving, from the user input device, user input indicating a request to create an event and to share information among a group of devices only within a predetermined time period;
  receiving information from each respective user device in the group during the predetermined time period; and
  distributing the received information only to the group of user devices during the predetermined time period;
  generating a summary of the event after the predetermined time period expires; and
  distributing the generated event summary to the user devices in the group,
  wherein the information comprises at least one of geographic locations of the group of user devices and imagery taken by one or more of the group of user devices during the event.

* * * * *